US009210461B2

United States Patent
Roberts et al.

(10) Patent No.: US 9,210,461 B2
(45) Date of Patent: Dec. 8, 2015

(54) THEME-BASED MEDIA PROGRAM DISCOVERY SYSTEMS AND METHODS

(71) Applicant: Verizon and Redbox Digital Entertainment Services, LLC, Basking Ridge, NJ (US)

(72) Inventors: Brian F. Roberts, Dallas, TX (US); Christina S. Siegfried, Irving, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 346 days.

(21) Appl. No.: 13/851,629

(22) Filed: Mar. 27, 2013

(65) Prior Publication Data

US 2014/0298385 A1    Oct. 2, 2014

(51) Int. Cl.
| | |
|---|---|
| H04N 21/258 | (2011.01) |
| H04N 21/278 | (2011.01) |
| H04N 21/433 | (2011.01) |
| H04N 21/482 | (2011.01) |
| H04N 21/84 | (2011.01) |
| G06F 17/30 | (2006.01) |
| H04N 21/25 | (2011.01) |
| H04N 21/475 | (2011.01) |

(52) U.S. Cl.
CPC ...... *H04N 21/4332* (2013.01); *G06F 17/30002* (2013.01); *G06F 17/30843* (2013.01); *H04N 21/251* (2013.01); *H04N 21/25891* (2013.01); *H04N 21/278* (2013.01); *H04N 21/475* (2013.01); *H04N 21/482* (2013.01); *H04N 21/4826* (2013.01); *H04N 21/4828* (2013.01); *H04N 21/84* (2013.01)

(58) Field of Classification Search
CPC .......... H04N 21/25891; H04N 21/278; H04N 21/4332; H04N 21/482; H04N 21/4828; H04N 21/4826; H04N 21/84; G06F 17/30002; G06F 17/30843
See application file for complete search history.

(56) References Cited

U.S. PATENT DOCUMENTS

| | | | | |
|---|---|---|---|---|
| 2006/0129547 | A1* | 6/2006 | Yamamoto et al. | 707/5 |
| 2007/0112935 | A1* | 5/2007 | Espelien | 709/217 |
| 2007/0245399 | A1* | 10/2007 | Espelien | 725/133 |
| 2013/0205320 | A1* | 8/2013 | Kim et al. | 725/14 |
| 2013/0297447 | A1* | 11/2013 | Sakata | 705/26.7 |
| 2014/0280140 | A1* | 9/2014 | Ling et al. | 707/737 |

* cited by examiner

*Primary Examiner* — Ricky Chin

(57) ABSTRACT

An exemplary method includes a theme-based media program discovery system 1) concurrently maintaining data representative of a first active media program curation heuristic that specifies a first set of curation parameters associated with a media program theme and a second active media program curation heuristic that specifies a second set of curation parameters associated with the media program theme, 2) curating, based on the first active media program curation heuristic, a first set of one or more media programs related to the media program theme, and 3) curating, based on the second active media program curation heuristic, a second set of one or more media programs related to the media program theme. Corresponding systems and methods are also disclosed.

15 Claims, 14 Drawing Sheets

THEME-BASED MEDIA PROGRAM DISCOVERY SYSTEMS AND METHODS

BACKGROUND INFORMATION

There are diverse ways for people to find and consume media programs. For example, a person wanting to watch a movie may utilize a traditional video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

A video service typically provides a user of the service with tools for discovering video programs, such as user interface tools for searching or browsing for video programs. However, there remains room for new and/or improved tools and/or features that may further benefit users of the service, a provider of the service, and/or third parties such as content providers and/or advertisers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
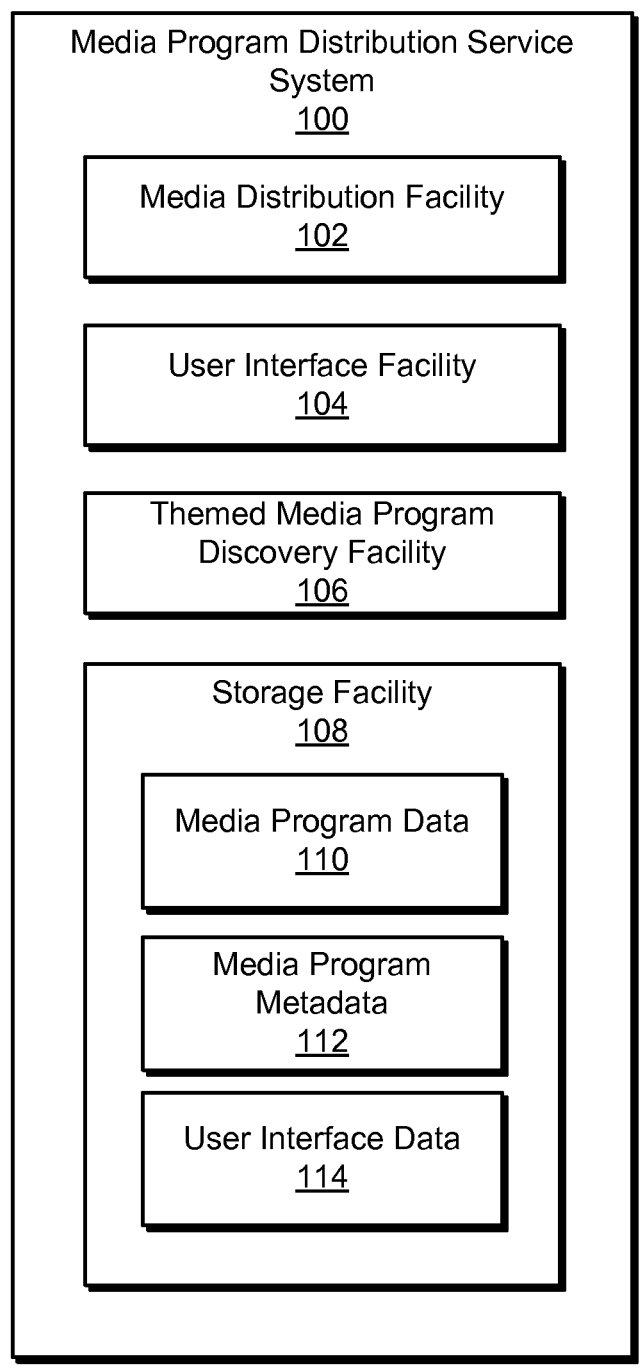
FIG. 1 illustrates an exemplary media program distribution service system according to principles described herein.

Exemplary theme-based media program discovery systems and methods are disclosed herein. The systems and methods described herein may provide for automatic curation of media programs related to a media program theme and use of the curated media programs to provide at least one theme-based media program discovery feature ("theme-based feature") configured to facilitate user discovery of media programs related to the theme. As used herein, automatic curation of media programs related to a media program theme may include identification (e.g., from a library of media programs) of a set of one or more media programs that are related to the media program theme and generation of data representative of the identified set of one or more media programs. The data representative of the curated set of one or more media programs may be used to provide one or more theme-based features, which may include any of the exemplary theme-based features of a theme-based media program discovery service and/or a media program distribution service described herein.

The systems and methods described herein may maintain one or more media program curation heuristics that specify one or more sets of curation parameters configured to be used by the systems and methods to automatically curate themed sets of media programs. In certain examples, the systems and methods described herein may concurrently maintain data representative of multiple discrete media program curation heuristics associated with a single media program theme and configured to be used by the systems and methods to automatically curate discrete sets of media programs related to the theme. Examples of such media program curation heuristics and the maintenance thereof are described herein.

The systems and methods described herein may benefit end users and/or a provider of a service (e.g., a media program distribution service, a theme-based media program discovery service, etc.), providers of media programs, advertisers, and/or one or more other entities. For example, one or more of the theme-based features described herein may enhance user experiences with discovery of media programs related to themes in which users may be interested.

As another example, the concurrent maintenance of multiple discrete media program curation heuristics for the same media program theme, such as described herein, may support automatic and/or collaborative curation of themed media programs with a minimal resource commitment from a service provider. To illustrate one example, a first user may provide input to create a group of movies related to a theme, and a second user may provide input to create another group of movies related to the same theme. For example, the movies may include car chases, the theme may be titled "Great Car Chases," and the users may create groups of different movies related to the theme. The systems and methods may generate a first curation heuristic that is specific to the first user based on the first-user-defined group of movies related to the theme, such as by defining a set of parameters that includes metadata associated with the movies in the first group. The systems and methods may also generate a second curation heuristic that is specific to the second user based on the second-user-defined group of movies related to the theme, such as by defining a set of parameters that includes metadata associated with the movies in the second group. The systems and methods may further generate a service-level curation heuristic based on the first and second user-specific curation heuristics and/or the first and second sets of movies related to the theme. Based on any of the curation heuristics associated with the theme, the systems and methods may curate a set of movies, such as by identifying, from a library of movies, movies that have metadata that matches the set of parameters of the curation heuristic being used. The systems and methods may make a curated service-level set of movies generally available to users of a service, such as by presenting user interface content representative of the curated service-level set of movies in a user interface as movies related to the "Great Car Chases" theme. A user of a service may use this user interface content to access the curated set of movies or any movie included therein. In addition, the user of the service may provide user input to use the curated service-level set of movies to form a new set of movies related to the theme and specific to the user. The systems and methods may continue, over time, to automatically update and use the service-level curation heuristic to curate an updated service-level set of movies and to provide one or more of the theme-based media program discovery features described herein based on the service-level curation heuristic and/or the service-level set of movies, such as described herein.

Exemplary theme-based media program discovery systems and methods and implementations thereof will now be described in reference to the accompanying drawings.

FIG. 1 illustrates an exemplary media program distribution service system 100 ("system 100"). System 100 may be configured to facilitate consumption of media programs by one or more users. For example, system 100 may be configured to provide a media program distribution service ("media service") to one or more end-users of the media service (e.g., one or more subscribers to the media service). System 100 may be associated with (e.g., operated by) a provider of the media service ("service provider"). Through the media service, an end user of the media service may discover and/or consume media programs distributed by system 100.

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of a media program distribution service. Such media programs that are made available for user consumption by the media program distribution service may be accessed and/or played back by an appropriately configured user computing device (e.g., a media player device) for presentation to the user.

As shown in FIG. 1, system 100 may include, without limitation, a media distribution facility 102, a user interface facility 104, a themed media program discovery facility 106 ("discovery facility 106"), and a storage facility 108 selectively and communicatively coupled to one another. The facilities may be communicatively coupled one to another by any suitable communication technologies.

Storage facility 108 may be configured to store media program data 110 representative of media programs that may be distributed by media distribution facility 102, media program metadata 112 for the media programs (e.g., descriptive of the media programs) represented by media program data 110, and user interface data 114 generated and/or used by user interface facility 104 to provide one or more user interfaces, such as described herein. Storage facility 108 may maintain additional or alternative data as may serve a particular implementation.

Media distribution facility 102 may be configured to distribute media programs to users of a media service provided by system 100. Media distribution facility 102 may be configured to distribute media programs in any way and/or form that is suitable to facilitate consumption of the media programs by users of the media service. In certain examples, media distribution facility 102 may be configured to distribute physical copies of media programs to users of the media service. Additionally or alternatively, in certain examples, media distribution facility 102 may be configured to stream or download data representative of media programs over one or more networks (e.g., Internet Protocol ("IP") wide area networks such as the Internet).

Figure 2:
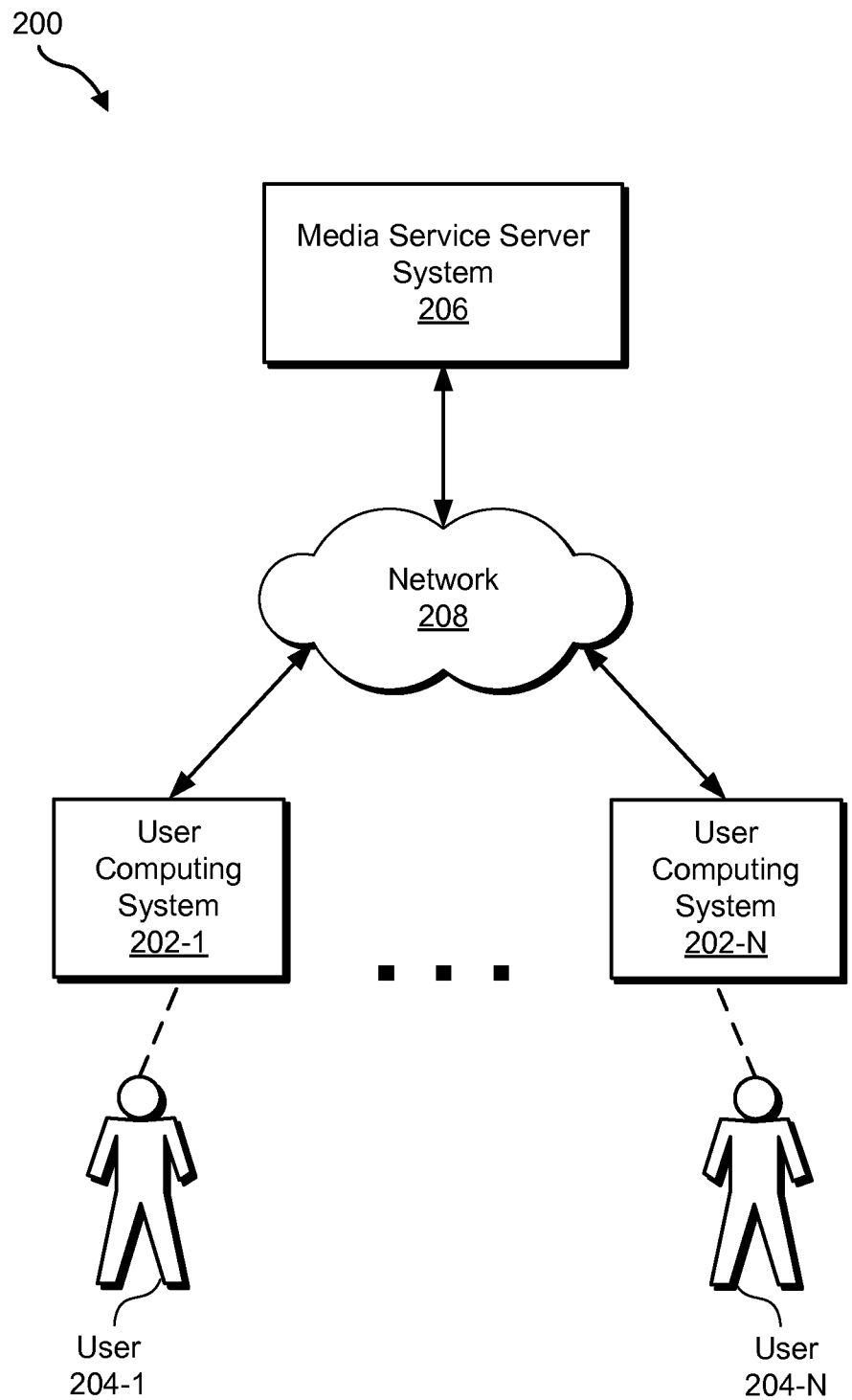
FIG. 2 illustrates an exemplary implementation of the system of FIG. 1 according to principles described herein.

FIG. 2 shows an exemplary implementation 200 of system 100. As shown, implementation 200 may include user computing systems 202 (e.g., user computing systems 202-1 through 202-N) respectively associated with users 204 (e.g., users 204-1 through 204-N), which may be end users of the media service provided by system 100. User computing systems 202 may be in communication with a media service server system 206 ("server system 206"), which may include one or more computing devices (e.g., server devices remotely located from user computing systems 202). In implementation 200, one or more of facilities 102-108 of system 100 may be implemented entirely by a user computing system 202, entirely by server system 206, or distributed across a user computing system 202 and server system 206 in any manner configured to facilitate a user 204 accessing the media service and/or media programs provided by system 100.

User computing systems 202 and server system 206 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 202 and server system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing systems 202 and server system 206. Communications between user computing systems 202 and server system 206 may be transported using any one of the above-listed networks, or any combination or sub-combination of the above-listed networks. Alternatively, user computing systems 202 and server system 206 may communicate in another way such as by direct connections between user computing systems 202 and server system 206.

Server system 206 may be configured to distribute media programs to user computing systems 202 for access and use by user computing systems 202 to present media programs for consumption by users 204. Server system 206 may distribute media programs to user computing systems 202 as part of the media service provided by system 100 and using any suitable media streaming and/or downloading technologies (e.g., Internet media streaming and/or downloading technologies). In certain examples, the media service may comprise an online media streaming service such as an Internet streaming video service, and server system 206 may be configured to stream media programs to user computing systems 202 by way of network 208.

A user computing system 202 may be configured for use by a user 204 associated with (e.g., operating) the user computing system 202 to access the media service provided by system 100. For example, the user 204 may utilize the user computing system 202 to access one or more user interfaces provided by system 100 as part of the media service, and to present the user interfaces for use by the user 204 to discover, access, and consume media programs distributed by server system 206 as part of the media service.

A user computing system 202 may include one or more user computing devices associated with a user 204. Examples of such devices include, without limitation, a media player computing device, a display device, a set-top box, a digital video recording ("DVR") device, a computer, a tablet computer, a smart phone device, and any other device capable of accessing the media service and/or media programs provided by system 100.

In certain examples, a user computing system 202 may include a first user computing device (e.g., a primary display device) configured to play back a media program and a second user computing device (e.g., a secondary or companion display device) configured to display a graphical user interface that may compliment or be used together with the playback of the media program by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 202 may include any combination of user computing devices or a single user computing device configured to perform any of the user computing system and/or device operations described herein.

Returning to FIG. 1, user interface facility 104 may be configured to provide a user interface through which users 204 may access and interface with the media service to discover, access, and consume media programs. The user interface may be in any suitable form. For example, user interface facility 104 may be configured to provide a website, a client application user interface (e.g., a user interface provided by a client application such as a "mobile app" installed and running on a user computing system 202), a media player user interface, a graphical user interface, and/or any other form of user interface configured to facilitate interaction with the media service. Accordingly, a user 204 of a user computing system 202 may utilize the user computing system 202 to access a user interface provided by user interface facility 104 in order to interact with the media service to discover, access, and/or consume media programs distributed as part of the media service.

User interface facility 104 may be configured to provide any of the exemplary user interfaces illustrated herein, including one or more user interfaces that include one or more theme-based features. Accordingly, a user 204 may access and/or use the feature(s) through the user interface(s). Examples of theme-based features in user interfaces are described herein.

Discovery facility 106 may be configured to perform one or more of the media program discovery operations described herein, including one or more of the theme-based media program discovery operations described herein. In certain examples, discovery facility 106 may interact with user interface facility 104 in any suitable way to perform such operations by way of one or more user interfaces provided by user interface facility 104.

Figure 3:
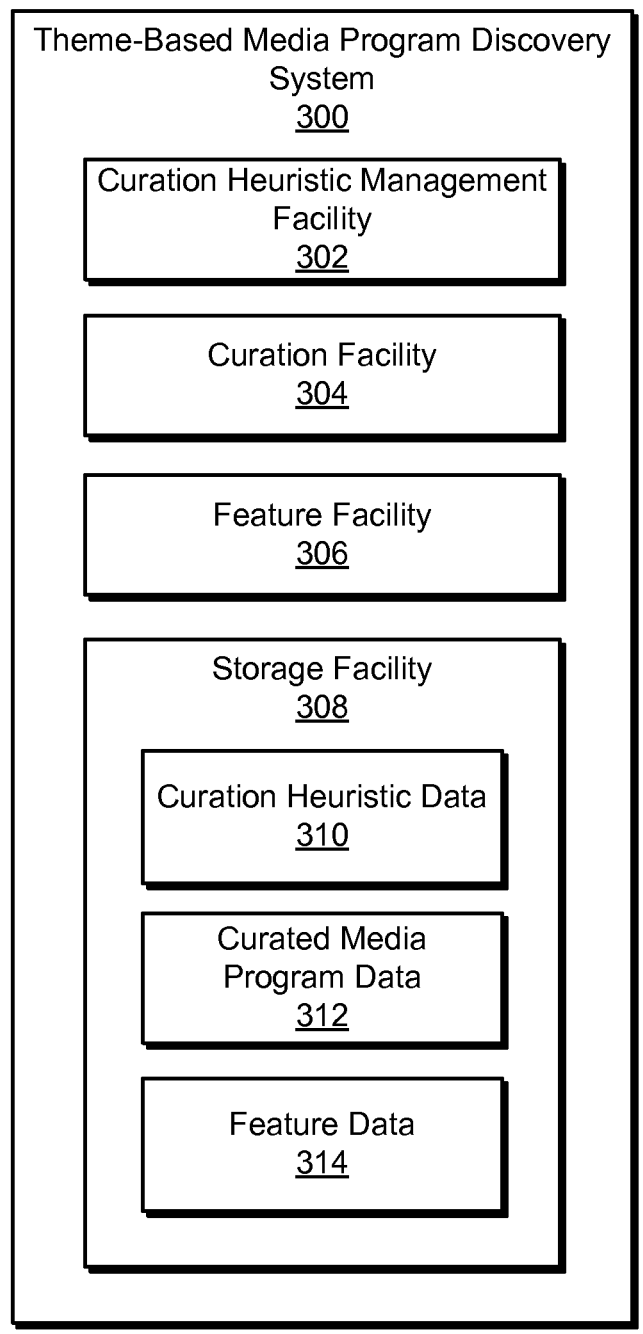
FIG. 3 illustrates an exemplary theme-based media program discovery system according to principles described herein.

To this end, discovery facility 106 and/or user interface facility 104 may implement a theme-based media program discovery system configured to perform one or more of the theme-based media program discovery operations described herein. FIG. 3 illustrates an exemplary theme-based media program discovery system 300 ("system 300") configured to provide a theme-based media program discovery service ("discovery service"), which may be part of or otherwise associated with the media service provided by system 100. As shown, system 300 may include, without limitation, a curation heuristic management facility 302 ("management facility 302"), a curation facility 304 ("curation facility 304"), a feature facility 306, and a storage facility 308 selectively and communicatively coupled to one another. The facilities may be communicatively coupled one to another by any suitable communication technologies.

Storage facility 308 may be configured to maintain curation heuristic data 310 representative of one or more themed media program curation heuristics configured to be used by curation facility 304 to curate media programs associated with one or more media program themes, curated media program data 312 representative of one or more curated sets of one or more media programs, and feature data 314 representative of, used by, or used to provide one or more theme-based features. Storage facility 308 may maintain additional or alternative data as may serve a particular implementation.

Management facility 302 may be configured to manage one or more media program curation heuristics configured to be used by curation facility 304 to automatically curate media programs associated with one or more media program themes. Each curation heuristic may be associated with a particular media program theme and may specify a set of curation parameters configured to be used by curation facility 304 to identify media programs associated with the theme.

Figure 4:
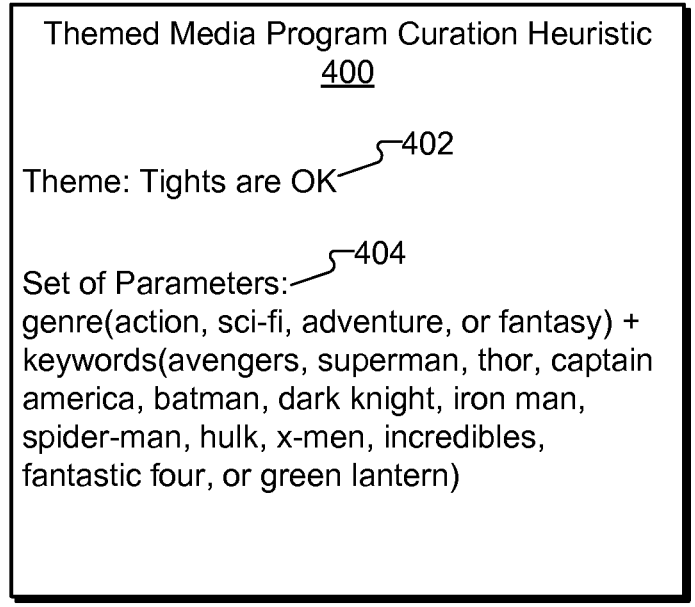
FIG. 4 illustrates an example of a themed media program curation heuristic ("curation heuristic") according to principles described herein.

To illustrate, FIG. 4 shows an example of a themed media program curation heuristic 400 ("curation heuristic 400"). As shown, curation heuristic 400 is associated with a theme 402 titled "Tights are OK" and includes a set of parameters 404 configured to be used by curation facility 304 to identify media programs associated with the "Tights are OK" theme 402.

A media program theme (or simply "theme") may refer to any themed category of media programs defined by a provider and/or one or more end users of the media service and/or the discovery service. A theme may be designed to encompass media programs having shared attributes related to the theme.

For example, the "Tights are OK" theme 402 may be designed to encompass media programs about superheroes who wear tights.

The set of parameters 404 may specify any set of criteria and/or logic that may be used by curation facility 304 to identify media programs associated with theme 402. For example, the set of parameters 404 may specify one or more metadata values that may be used by curation facility 304 to search metadata associated with media programs included in a library of media programs to identify, from the library, a set of media programs associated with the theme 402.

Metadata associated with media programs and/or specified by the set of parameters 404 may include any type of metadata. For example, the metadata may include standard metadata included in electronic program guide data and/or received from a service that provides electronic program guide data and/or metadata. Additionally or alternatively, the metadata may include participatory metadata provided by one or more end users of the media service and/or the discovery service (e.g., user-generated tags, comments, labels, ratings etc. for media programs) and/or generated by system 100 and/or system 300 based on user interactions with the media service and/or the discovery service (e.g., based on user input provided to discover, access, and/or consume media programs within the media service).

Examples of metadata may include, without limitation, media program genres (e.g., romantic comedy, action, etc.), categories (e.g., animated, television programs, movies, etc.), ratings (e.g., G, PG, PG-13, etc.), release dates, actors, directors, producers, descriptive tags (e.g., user-generated tags), keywords, awards, geographic locations, distribution type (e.g., streaming or physical medium), duration, and/or any other metadata representative of attributes of media programs. The set of parameters 404 may specify values for any combination of such metadata such that the set of parameters 404 specifies a set of conditions to be satisfied by a media program for the media program to be selected to fit within the theme 402. In certain examples, the set of parameters 404 may weight or otherwise prioritize certain metadata values such that the metadata values are given prioritized consideration by curation facility 304.

The examples of the theme 402 and corresponding set of parameters 404 described above are illustrative only. Other themes and/or corresponding sets of parameters may be associated with other curation heuristics in other examples.

Returning to FIG. 3, curation facility 304 may be configured to curate a set of one or more media programs based on a curation heuristic. For example, curation facility 304 may use a curation heuristic to curate, from a collection of media programs such as a service library of media programs (i.e., a service-wide library of media program available across the media and/or discovery service) and/or a user-specific library of media programs (i.e., a library of media programs specific to a user of the media and/or discovery service), a set of one or more media programs that are related to a theme of the curation heuristic. The curation may include curation facility 304 using the set of parameters specified by the curation heuristic to identify the set of one or more media programs that are related to the theme (i.e., match the theme as defined by the set of parameters) and generating data representative of the identified set of one or more media programs. The identified set of one or more media programs may be referred to as a curated set of one or more media programs. Curation facility 304 may store data representative of a curated set of one or more media programs as curated media program data 312 in storage facility 308.

Figure 5:
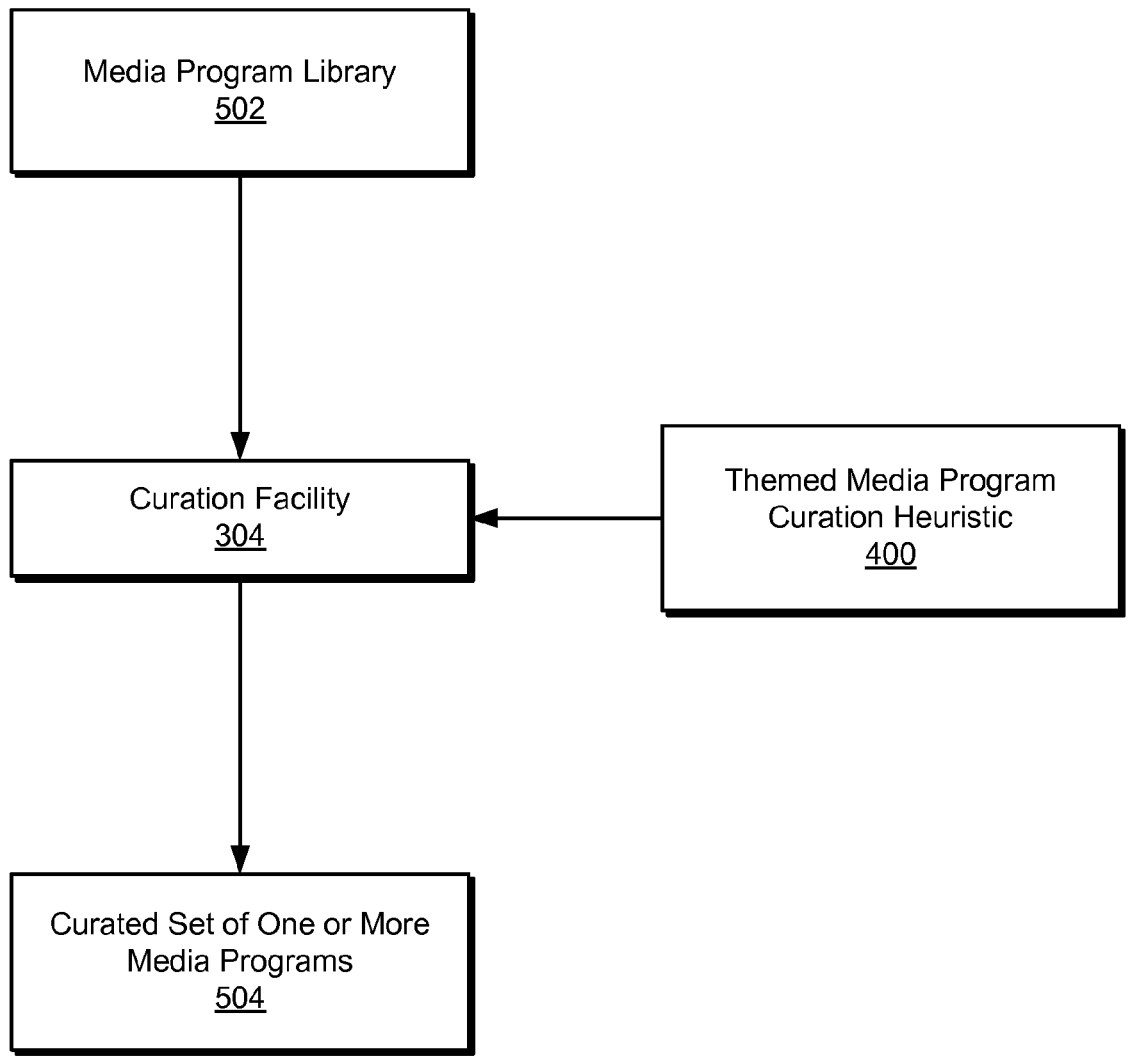
FIG. 5 illustrates an example of a generation of a curated set of one or more media programs according to principles described herein.

FIG. 5 illustrates an example of curation facility 304 using curation heuristic 400 and data associated with a media program library 502 to generate data representative of a curated set of one or more media programs 504 that are related to the theme 402 of curation heuristic 400. For example, curation facility 304 may use the set of parameters 404 included in curation heuristic 400 to search metadata (e.g., programming metadata and/or participatory metadata) and/or other data associated with the media program library 502 to identify any matching media programs included in the library 502. The identified media programs are determined to be related to the theme 402 of curation heuristic 400, and data indicative of the identified media programs is generated to represent the curated set of media programs. For example, the curated set of media programs may specify media programs such as movies titled "Avengers," "Spiderman," and "Thor" that have been determined to be related to the "Tights are OK" theme 402 based on the set of parameters 404 of curation heuristic 400.

In certain examples, the curation of the set of one or more media programs 504 related to the theme 402 may further include arranging media programs within the set. For example, curation facility 304 may be configured to arrange the media programs in any suitable order, such as from most complete match to least complete match depending on the level at which each identified media program matches the parameters 404 of curation heuristic 400. As another example, the order of the media programs within the set may be based on any subset of the parameters 404. For instance, media programs of a first particular genre may precede media programs of second particular genre within the set based on the parameters 404 (e.g., the parameters may prioritize the first genre over the second genre, such as by listing the first genre before the second genre or by weighting the genres by order of priority). In this or a similar manner, curation facility 304 may order media programs within the set based on one or more parameters specified by curation heuristic 400.

Returning again to FIG. 3, feature facility 306 may be configured to provide one or more features of a media and/or discovery service, including one or more theme-based media program discovery features that are based on data representative of curated media programs generated by curation facility 304. Such a theme-based media program discovery feature may include any feature of the media and/or discovery service, the providing of which is based at least in part on at least one curated set of one or more media programs. To this end, feature facility 306 may be configured to access and use curated media program data 312 to provide one or more theme-based media program discovery features of the media and/or discovery service. Examples of such features of the media and/or discovery service will now be described.

Feature facility 306 may be configured to provide one or more features that facilitate user access to one or more media programs represented by a curated set of one or more media programs. For example, feature facility 306 may provide one or more user interface features configured to facilitate user access to such media programs.

Figure 6:
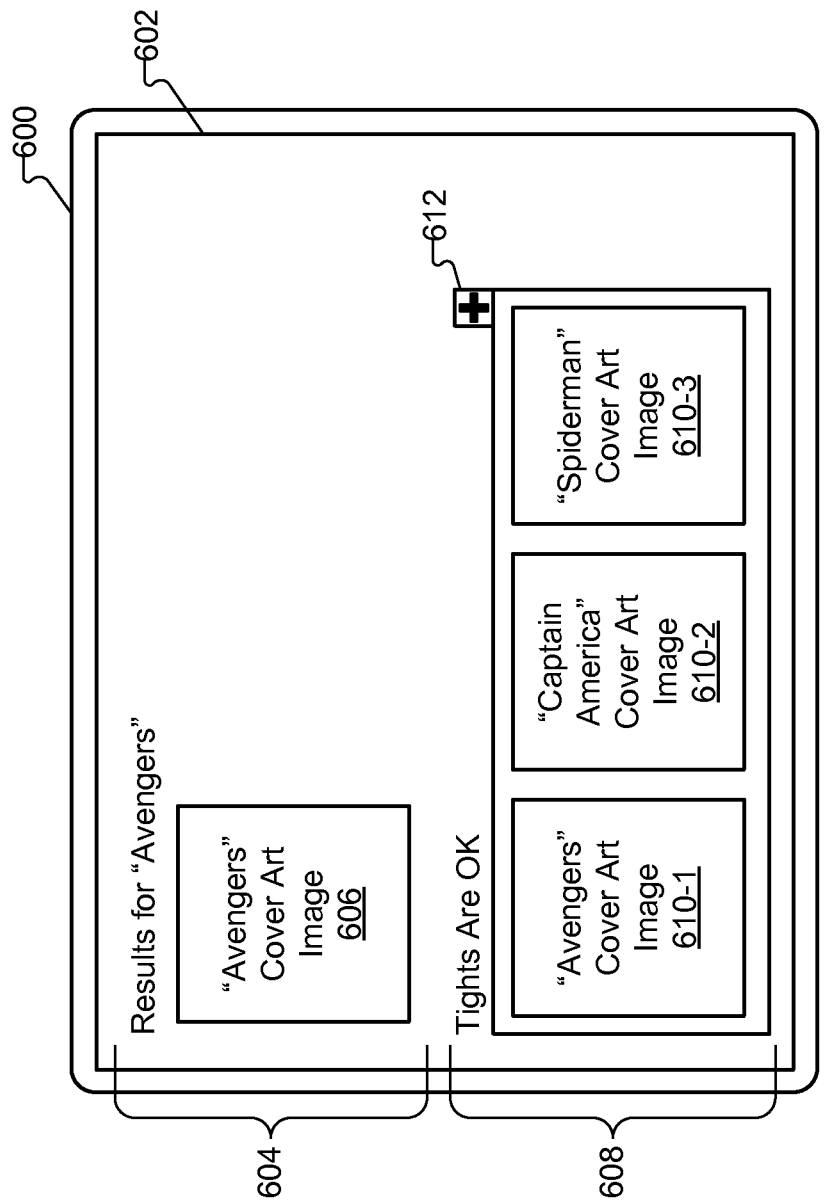
FIGS. 6-8 illustrate examples of theme-based media program discovery features in exemplary graphical user interface views according to principles described herein.

To illustrate an example, FIG. 6 depicts a user computing device 600 displaying a graphical user interface on a display screen 602. The graphical user interface may include a search results graphical user interface view that includes user interface content indicating search results for a user-initiated search of a media program library. In the illustrated example, in response to a search for the keyword "Avengers," search results for the search are displayed in a search results section 604 of the search results graphical user interface view. As shown, the search results may include a cover art image 606 for a matching movie titled "Avengers."

The search results graphical user interface view may also include one or more theme-based features associated with the search results. For instance, the search results graphical user interface view may include a related themes section 608 in which user interface content representing a theme associated with the search results is displayed. In the illustrated example, the related themes section 608 includes user interface content representing a theme titled "Tights are OK" and cover art images 610-1, 610-2, and 610-3 for movies titled "Avengers," "Captain America," and Spiderman," respectively, which are included in a curated set of media programs related to the theme.

The user interface content representing the "Tights are OK" theme may be displayed in section 608 in response to a detected association between the search results and the theme. For example, feature facility 306 may use the search results to search curation heuristic data 310 and/or curated media program data 312 for any themes related to the search results. For instance, feature facility 306 may search curated media program data 312 and determine that the "Avengers" movie included in the search results is part of a curated set of media programs represented by curated media program data 312. In response, feature facility 306 may display user interface content representative of at least a subset of the curated set of media programs, such as illustrated in FIG. 6.

In certain examples, the search results graphical user interface view may further include a user selectable option 612 displayed together with the user interface content representative of the theme and the curated set of media programs related to the theme. The option 612 may be configured to be selected by a user to initiate one or more media program discovery operations that are based on or otherwise related to the curated set of media programs related to the theme. In an exemplary implementation, for example, option 612 may be configured to be selected by a user to request access to additional information about and/or options for the theme and/or the curated set of media programs. In another exemplary implementation, for example, option 612 may be configured to be selected by a user to cause system 300 to add the curated set of media programs to a personalized, user-specific library of media programs associated with the user and maintained by system 300.

Figure 7:
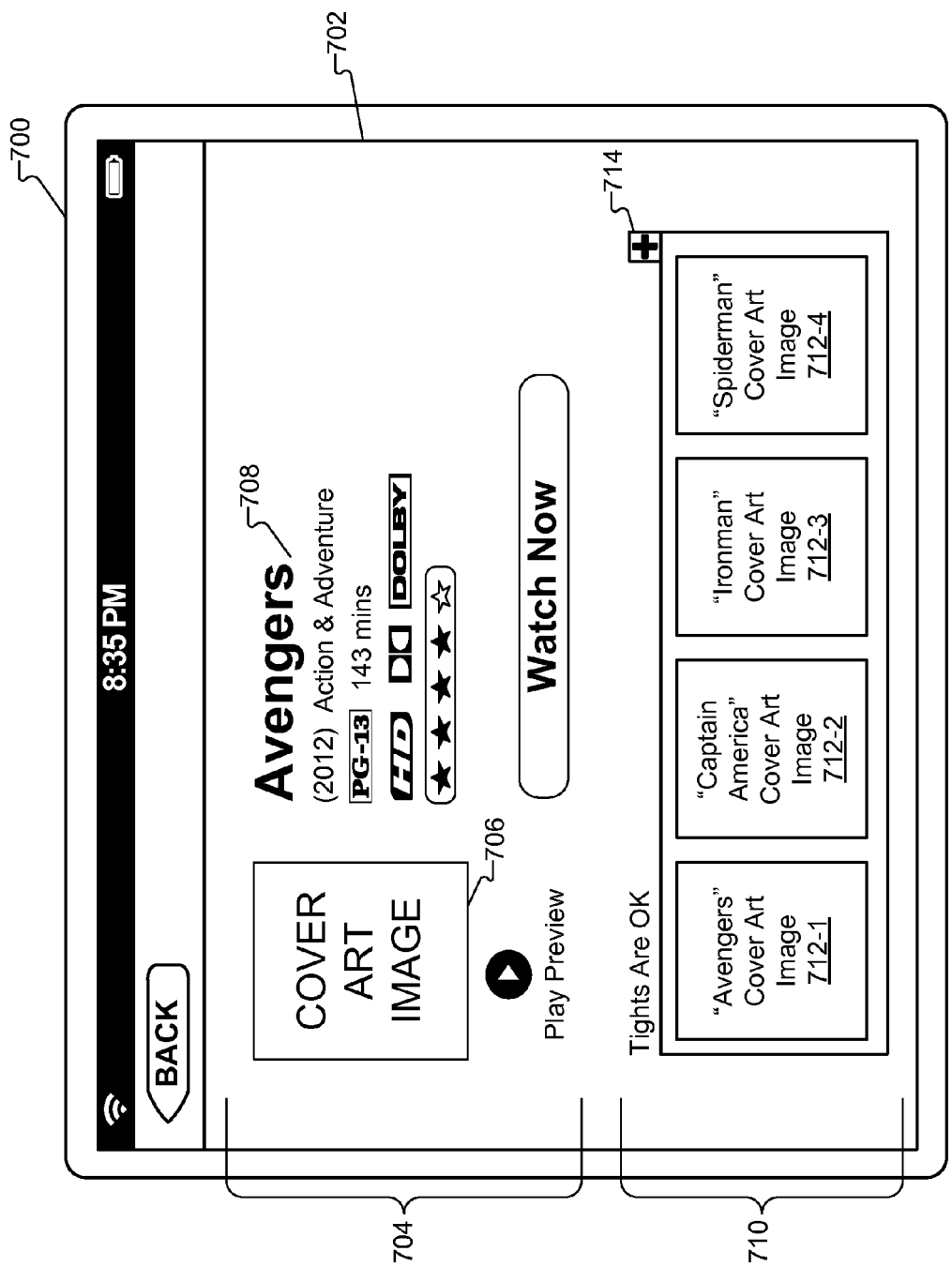

To illustrate another example, FIG. 7 depicts a user computing device 700 displaying a graphical user interface on a display screen 702. The graphical user interface may include a title details graphical user interface view that includes detailed information about a particular media program. In the illustrated example, detailed information about the "Avengers" movie is displayed in a title details section 704 of the graphical user interface. As shown, the title details may include a cover art image 706 and detailed information 708 for the "Avengers" movie.

The title details graphical user interface view may also include one or more theme-based features associated with the titled movie and/or title details of the movie. For instance, the search results graphical user interface view may include a related themes section 710 in which user interface content representing a theme associated with the movie represented by the title details is displayed. In the illustrated example, the related themes section 710 includes user interface content representing a theme titled "Tights are OK" and cover art images 712-1, 712-2, 712-3, and 712-4 for movies titled "Avengers," "Captain America," "Ironman," and Spiderman," respectively, which are included in a curated set of media programs related to the movie represented in the title details section 704 of the title details graphical user interface view.

In certain examples, the title details graphical user interface view may further include a user selectable option 714 displayed together with the user interface content representative of the theme and the curated set of media programs related to the theme. The option 714 may be configured to be selected to initiate one or more media program discovery operations that are based on or otherwise related to the curated set of media programs related to the theme. In an exemplary implementation, option 714 may be configured to be selected by a user to request access to additional information about and/or options for the theme and/or the curated set of media programs. In another exemplary implementation, option 714 may be configured to be selected by a user to cause system 300 to add the curated set of media programs to a personalized, user-specific library of media programs associated with the user and maintained by system 300.

Figure 8:
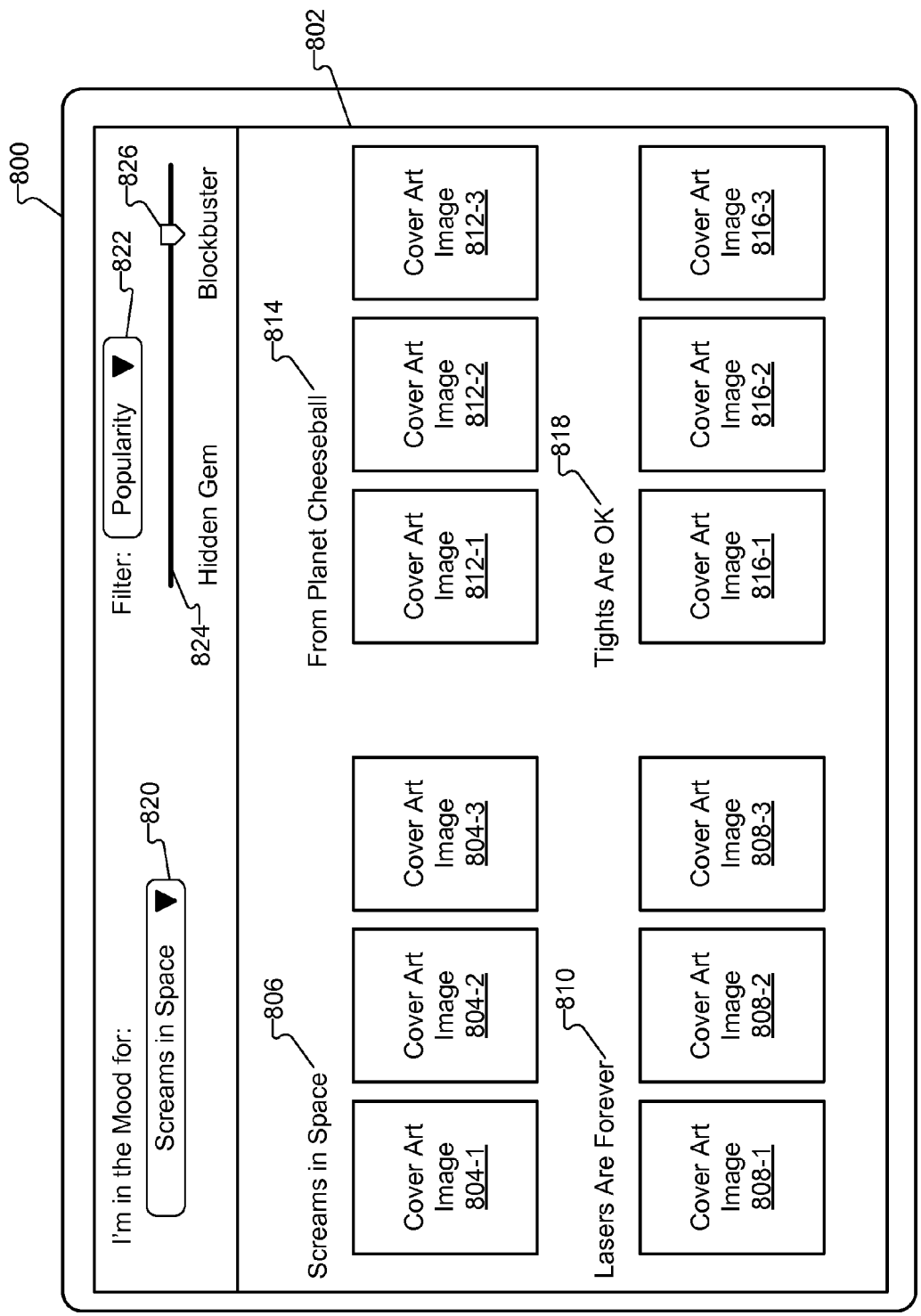

To illustrate another example, FIG. 8 depicts a user computing device 800 displaying a graphical user interface on a display screen 802. The graphical user interface may include a themed media program navigation view that includes user interface content representing media programs arranged by themes. In the illustrated example, cover art images representing media programs are grouped by themes within the graphical user interface. In particular, cover art images 804 (e.g., cover art images 804-1 through 804-3) are grouped and presented to represent a curated set of media programs related to a theme 806 titled "Screams in Space," cover art images 808 (e.g., cover art images 808-1 through 808-3) are grouped and presented to represent a curated set of media programs related to a theme 810 titled "Lasers are Forever," cover art images 812 (e.g., cover art images 812-1 through 812-3) are grouped and presented to represent a curated set of media programs related to a theme 814 titled "From Planet Cheeseball," and cover art images 816 (e.g., cover art images 816-1 through 816-3) are grouped and presented to represent a curated set of media programs related to a theme 818 titled "Tights are OK."

The themed media program navigation view may further include one or more features configured to be used by a user to provide input specifying filter parameters to be used by feature facility 306 to determine the themes, media programs, and/or arrangement of themes and/or media programs to be represented in the themed media program navigation view. In the illustrated example, the themed media program navigation view includes a drop-down theme selection tool 820 configured to be used by a user to select, from a list of themes, a particular theme in which the user is interested. In FIG. 8, the selected theme is titled "Screams in Space."

In response to a selection of the "Screams in Space" theme, feature facility 306 may search curation heuristic data 310 and/or curated media program data 312 for themes and/or media programs that are related to the selected theme. Feature facility 306 may determine that the "Screams in Space" theme is related to (e.g., a 100% match for) the selected theme and display user interface content representing the "Screams in Space" theme in the themed media program navigation view. As shown, this may include displaying cover art images 804 for media programs included in a curated set of media programs related to the "Screams in Space" theme.

Feature facility 306 may similarly determine that other themes are related to the selected theme. For example, feature facility 306 may determine that a theme titled "Lasers are Forever" is related to the "Screams in Space" theme. The determination may be made in any suitable way, such as by detecting an overlap between media programs included in curated sets of media programs associated with the two themes. For instance, the curated set of media programs for the "Screams in Space" theme may include one or more media programs that are also included in the curated set of media programs for the "Lasers are Forever" theme.

Feature facility 306 may similarly determine that other themes are related to any theme represented in the themed media program navigation view. For example, feature facility 306 may determine that a theme titled "From Planet Cheeseball" or a theme titled "Tights are OK" is related to the "Screams in Space" theme or the "Lasers are Forever" theme. The determination may be made in any suitable way, including based on a detected overlap of media programs across curated sets of media programs for the themes.

If a user uses tool 820 to select a different theme from a drop-down menu, feature facility 306 may respond by updating the user interface content to represent a new set of themes and/or themed sets of media programs related to the selected theme. The update may include changing an arrangement of user interface content, such as a repositioning of themes and/or media program cover art images within the themed media program navigation view.

In the illustrated example, the themed media program navigation view includes another tool in the form of a drop-down filter scale selection tool 822 configured to be used by a user to select, from a list of filter scales, a particular filter scale to be used to filter the themed media programs represented in the themed media program navigation view. In FIG. 8, the selected filter scale is titled "Popularity," which represents a scale of popularity of media programs.

In response to a selection of the popularity filter scale, feature facility 306 may display a popularity filter scale object 824 and a slider 826 as shown in FIG. 8. The slider 826 may be moved along the length of object 824 by a user to select a filter scale value to be used by feature facility 306 to filter the themed media programs represented in the themed media program navigation view. Object 824 may represent a scale of popularity values ranging from "hidden gems" that are relatively less popular media programs (e.g., media programs accessed infrequently by users of the media service compared to other media programs) to "blockbusters" that are relatively more popular media programs (e.g., media programs accessed frequently by users and/or by a large number of users of the media service compared to other media programs).

The user may position slider 826 to cause feature facility 306 to filter the user interface content in the themed media program navigation view based on a selected popularity scale value. If the slider 826 is positioned as shown in FIG. 8, feature facility 306 may populate the themed media program navigation view with user interface content representative of themed media programs that are relatively more popular among users of the media service. If the slider 826 is moved to the other end of the filter scale object 824, feature facility 306 may populate the themed media program navigation view with user interface content representative of themed media programs that are relatively less popular among users of the media service. The selected filter scale value may be used by feature facility 306 to select themes (e.g., more popular or less popular themes) for inclusion in the themed media program navigation view, a presentation arrangement of themes in the themed media program navigation view (e.g., more or less popular themes presented more prominently, such as near the top of the themed media program navigation view based on the selected filter scale value), media programs to be represented in a theme group, and/or a presentation order of media programs within a theme group (e.g., more or less popular media programs presented more prominently, such as first in order in a theme group based on the selected filter scale value).

In certain examples, the popularity scale represented in FIG. 8 may represent scaled levels of popularity of media programs, which popularity may be based on viewership statistics for the media programs. In certain examples, the popularity scale may also take into account user ratings of the media programs. For example, only media programs that have at least a minimum fan rating (e.g., three or more stars) may be included in a set of media programs that are filtered based on the selected popularity level along the popularity filter scale. In such examples, hidden gems may include media programs having at least a three-star user rating and a relatively lower viewership level, and blockbusters may include media programs having at least a three-star user rating and a relatively higher viewership level.

The popularity filter scale illustrated in FIG. 8 is illustrative only. Other filter scales may be selected by a user using tool 822. Examples of other filter scales may include, without limitation, a "scariness" filter scale that allows a user to select, on the scale, a level of scariness of media programs in which the user is interested, a "goriness" filter scale that allows a user to select, on the scale, a level of goriness of media programs in which the user is interested, a "funniness" filter scale that allows a user to select, on the scale, a level of funniness of media programs in which the user is interested, a "watch frequency" filter scale that allows a user to select, on the scale, a level of how frequently media programs are watched, a "box office performance" filter scale that allows a user to select, on the scale, a box office performance level of media programs in which the user is interested.

The exemplary theme-based media program discovery features described above in reference to FIGS. 6-8 are illustrative only. Additional or alternative theme-based features may be provided in other implementations to facilitate theme-based discovery of media programs in accordance with principles described herein. For example, feature facility 306 may be configured to treat a curated set of one or more media programs as a playlist for one or more media program discovery, access, and/or consumption operations.

Such theme-based media program discovery features may enhance user experiences with the media and/or discovery services described herein. For example, any of the features may facilitate convenient user discovery of media programs related to media program themes in which users may be interested. In some examples, when a user discovers a media program in which the user is interested, one or more theme-based media program discovery features may facilitate the user conveniently discovering one or more other media programs that are similar in theme to the media program that is of interest to the user.

Returning to FIG. 3, as mentioned above, management facility 302 may be configured to manage one or more curation heuristics associated with one or more media program themes. This may include maintaining data representative of the curation heuristics for use by curation facility 304.

Management facility 302 may maintain data representative of a curation heuristic in any suitable way. For example, management facility 302 may generate and store data representative of the curation heuristic as curation heuristic data 310. Management facility 302 may also update the data representative of the curation heuristic to specify an updated set of parameters. In certain examples, one or more maintenance operations may be performed automatically by management facility 302 (e.g., without human intervention), which may reduce or eliminate the need for manual maintenance operations by a service provider, which may minimize the resource commitment needed from the service provider to maintain the curation heuristics. Examples of management facility 302 maintaining data representative of curation heuristics will now be described.

In certain examples, a media program theme and/or set of parameters associated with the theme may be originally defined by a provider of the media service and/or discovery service. For example, the provider may provide, to management facility 302 by way of a user interface, input specifying an identifier for the theme (e.g., a theme name such as "Tights are OK") and the set of parameters associated with the theme. In response, management facility 302 may originally generate and store data representative of a curation heuristic associated with the defined theme and specifying the defined set of parameters associated with the theme. The data representative of the curation heuristic is then available for use by curation heuristic 304 to curate a set of one or more media programs related to the theme-based on the set of parameters specified by the curation heuristic.

Additionally or alternatively, in certain examples, a media program theme and/or set of parameters associated with the theme may be originally defined by an end user of the media service and/or discovery service. For example, the user may provide, to management facility 302 by way of a user interface, input specifying an identifier for the theme (e.g., a theme name such as "Tights are OK") and the set of parameters associated with the theme. In response, management facility 302 may originally generate and store data representative of a curation heuristic associated with the defined theme and specifying the defined set of parameters associated with the theme. The data representative of the curation heuristic is then available for use by curation heuristic 304 to curate a set of one or more media programs related to the theme-based on the set of parameters specified by the curation heuristic.

In certain examples, management facility 302 may provide one or more user interface tools configured to facilitate express definition of a media program theme and/or corresponding set of parameters by a user. In other examples, management facility 302 may be configured to originally generate and store data representative of a curation heuristic based on user input that is a natural part of user interaction with the media service and/or the discovery service and not provided expressly or solely for the purpose of defining a media program theme and/or corresponding set of parameters. Such user input may be referred to as "normal work flow user input." Examples of normal work flow user input may include, without limitation, user input provided to navigate within a user interface, discover media programs, access media programs, consume media programs, organize media programs, and/or interact with other users of the media service and/or discovery service.

To illustrate one example, a user may provide input designed to link two media programs together, such as by adding the media programs to the same playlist or data folder. Management facility 302 may detect the relationship between the two media programs formed in response to the user input and may generate a curation heuristic based on the media programs. For example, management facility 302 may use metadata for the media programs to select a media program theme that fits both media programs. This may include identifying common attributes of the media programs and using the common attributes to select a theme. For instance, both media programs may be associated with user tags that include the words "car chase." Based on this, management facility 302 may select a theme such as "Great Car Chases." Management facility 302 may select the theme from a set of existing themes or may generate a new theme. Management facility 302 may automatically select and assign the theme to the generated curation heuristic or may recommend the selected theme to the user but allow the user to override the selection and provide a custom theme identifier.

Management facility 302 may further use metadata for the media programs to define a set of parameters for the curation heuristic. This may include identifying common attributes of the media programs and adding the common attributes to the set of parameters. For instance, both media programs may be associated with a common genre, actor, director, and/or other metadata values. Management facility 302 may detect and add such common attributes to the set of parameters.

In any of the ways described above, management facility 302 may originally generate and store data representative of a curation heuristic. In addition, management facility 302 may be configured to update the curation heuristic over time. For example, management facility 302 may be configured to update data representative of the media program theme associated with the curation heuristic (e.g., by changing the name of the theme) and/or the set of parameters specified by the curation heuristic. An update to the set of parameters may include any change to the set of parameters, including adding one or more parameters (e.g., by adding metadata), deleting one or more parameters (e.g., by deleting metadata), changing a weighting of one or more parameters, and/or changing the condition logic in the set of parameters.

Management facility 302 may be configured to update a curation heuristic in response to any suitable predetermined event. In certain examples, management facility 302 may update a curation heuristic in response to receipt of user input expressly redefining the theme and/or the set of parameters of the curation heuristic. This may include express input provided by a provider or an end user of the media service and/or the discovery service.

Additionally or alternatively, in certain examples, management facility 302 may update a curation heuristic based on normal work flow user input provided by one or more end users of the media service and/or the discovery service. For example, management facility 302 may update a curation heuristic based on detected normal work flow user input associated with a media program, such as navigating to the media program in a user interface, accessing the media program (e.g., purchasing, renting, downloading, or streaming the media program), adding the media program to a playlist or data folder, or otherwise providing normal work flow user input related to the media program.

In certain examples, management facility 302 may manage multiple discrete curation heuristics for a single media program theme. This may include concurrently maintaining data representative of multiple discrete curation heuristics associated with the single media program theme. Each of the curation heuristics associated with the theme may be active, meaning that each of the curation heuristics is currently designated for use by curation facility 304 to curate a set of media programs associated with the theme.

Management facility 302 may be configured to use multiple curation heuristics associated with a theme and/or relationships between the curation heuristics to maintain the curation heuristics, including updating one or more of the curation heuristics. Additionally or alternatively, feature facility 306 may be configured to use multiple curation heuristics associated with a theme and/or relationships between the curation heuristics to provide one or more theme-based media program discovery features. Examples of concurrently maintaining multiple distinct curation heuristics for a media program theme and providing theme-based media program discovery features based on the multiple curation heuristics will now be described.

Figure 9:
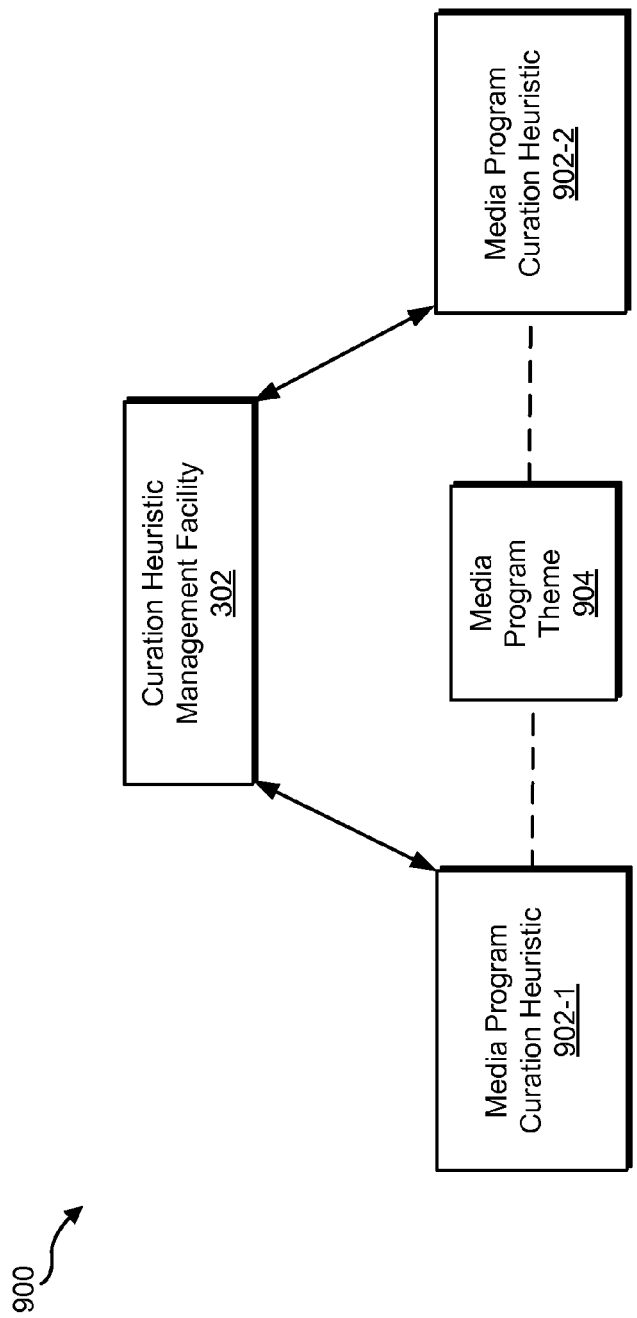
FIG. 9 illustrates an exemplary configuration in a first curation heuristic and a second curation heuristic associated with the same media program theme are concurrently maintained according to principles described herein.

FIG. 9 illustrates a configuration 900 in which management facility 302 concurrently maintains data representative of a first curation heuristic 902-1 and a second curation heuristic 902-1 associated with the same media program theme 904 (as represented by the dashed lines in FIG. 9). Curation heuristics 902-1 and 902-2 may be collectively referred to as "curation heuristics 902." Curation facility 304 may independently use either of the curation heuristics 902 to curate a set of one or more media programs associated with theme 904. In certain examples, curation heuristics 902 may specify different sets of parameters (e.g., a first set of parameters and a second set of parameters) such that different sets of media programs will be generated by curation heuristic 304 based on the curation heuristics 902. Thus, curation facility 304 may curate a first set of one or more media programs related to theme 904 based on the first curation heuristic and a second set of one or more media programs related to theme 904 based on the second curation heuristic.

Figure 10:
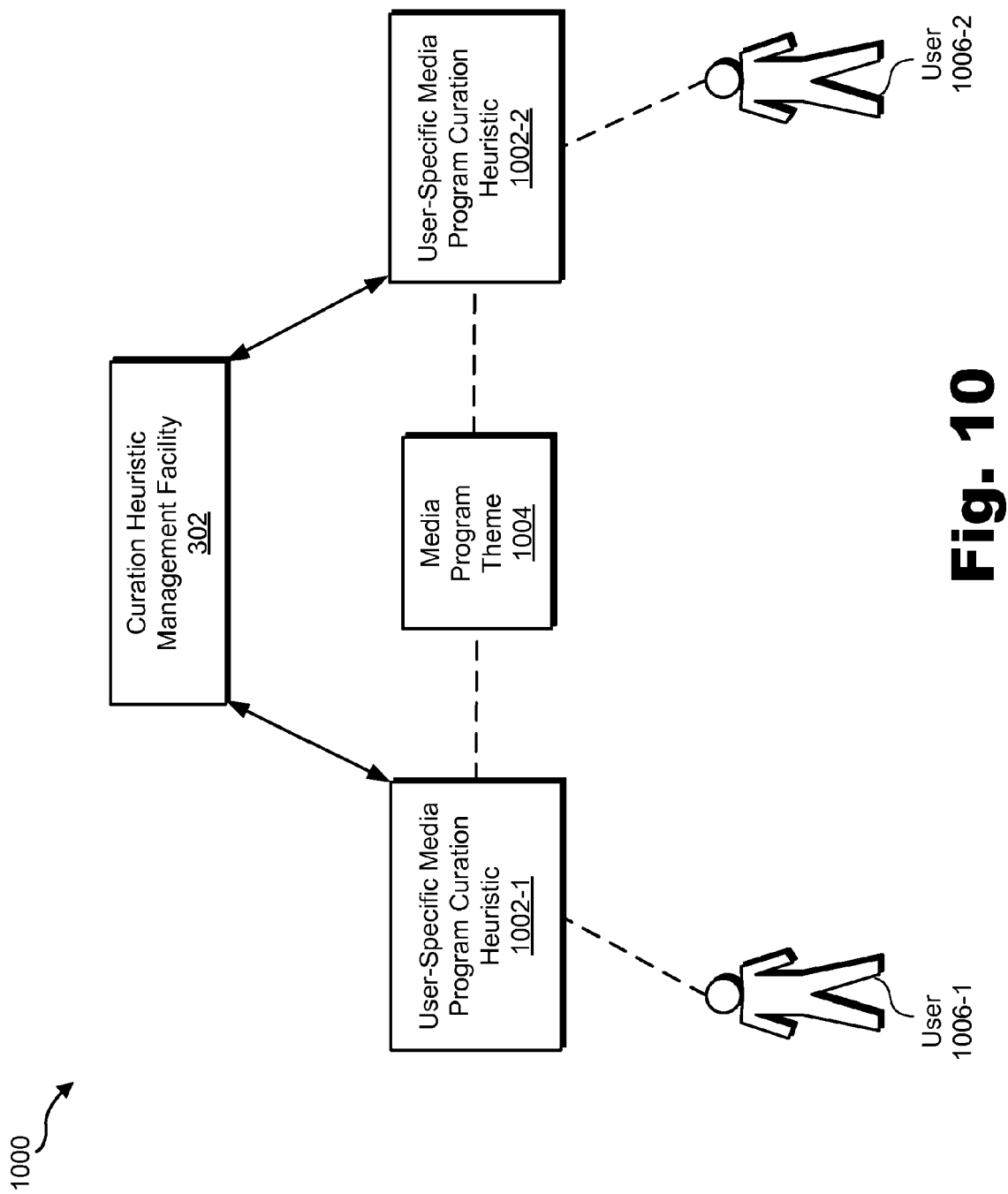
FIG. 10 shows an exemplary configuration in which a first user-specific curation heuristic and a second user-specific curation heuristic associated with the same media program theme are concurrently maintained according to principles described herein.

In certain examples, management facility 302 may maintain multiple discrete curation heuristics that are specific to end users of the media service and/or discovery service. Such curation heuristics may be referred to as user-specific curation heuristics. To illustrate, FIG. 10 shows a configuration 1000 in which management facility 302 concurrently maintains data representative of a first user-specific curation heuristic 1002-1 that is associated with a media program theme 1004 and is specific to a first user 1006-1 and a second curation heuristic 1002-2 that is associated with the same media program theme 1004 and is specific to a second user 1006-2 as represented by the dashed lines in FIG. 10.

Curation facility 304 may use curation heuristic 1002-1 to curate a first user-specific set of one or more media programs related to theme 1004 for the first user 1006-1 and curation heuristic 1002-2 to curate a second user-specific set of one or more media programs related to theme 1004 for the second user 1006-2. Feature facility 306 may be configured to provide, as a theme-based feature, user interface content representing the curated first user-specific set of one or more media programs for presentation to the first user 1006-1 and user interface content representing the curated second user-specific set of one or more media programs for presentation to the second user 1006-2. Each curated user-specific set of one or more media programs may be presented to the respective user in any suitable way, including in any of the exemplary ways described herein.

A user-specific curation heuristic may be specific to a user in that curation facility 304 will use the curation heuristic to curate a set of one or more media programs related to the theme for presentation only to the user. Additionally or alternatively, a user-specific curation heuristic may be specific to a user in that the set of parameters specified by the curation heuristic may be specific to the user (e.g., based on user input provided by the user). For example, the user may provide input to customize a curated set of media programs associated with a media program theme and generated by curation facility 304 based on a curation heuristic. Management facility 302 may detect the user customization and, based on the user customization, automatically update the curation heuristic to reflect the user customization.

As an example, the user may provide input to add a media program to a curated set of media programs associated with a media program theme and generated by curation facility 304 based on a curation heuristic. Based on the custom addition of the media program to the curated set of media programs, management facility 302 may automatically update the curation heuristic by adding metadata associated with the added media program to the set of parameters specified by the curation heuristic.

As another example, the user may provide input to delete a media program from the media programs included in a curated set of media programs associated with a media program theme and generated by curation facility 304 based on a curation heuristic. Based on the custom deletion of the media program from the curated set of media programs, management facility 302 may automatically update the curation heuristic by deleting metadata associated with the deleted media program from the set of parameters specified by the curation heuristic.

Feature facility 306 may be configured to provide one or more theme-based features based on multiple user-specific curation heuristics and/or sets of media programs curated by curation facility 304 based on the user-specific curation heuristics. Such features may be configured to promote themed media program discovery by one or more users.

To illustrate, feature facility 306 may be configured to analyze multiple curated sets of media programs that have been curated by curation facility 304 based on multiple user-specific curation heuristics associated with the same theme. Based on the analysis, feature facility 306 may provide a theme-based feature in the form of a media program recommendation to a user. For example, feature facility 306 may analyze a first curated set of one or more media programs specific to a first user and a second curated set of one or more media programs specific to a second user and determine a media program that is included in the first curated set but not in the second curated set. Feature facility 306 may provide a media program recommendation to recommend the media program to the second user. In certain examples, feature facility 306 may recommend the media program to the second user in conjunction with the media program theme, such as together with user interface content representative of the media program theme and/or the curated second set of media programs related to the theme.

For instance, a first curated set of media programs related to the "Tights are OK" theme and specific to a first user may include movies titled "Spiderman" and "Avengers," and a second curated set of media programs related to the same theme and specific to a second user may include movies titled "Spiderman," "Avengers," and "Iron Man 2" because the second user customized the second set of media programs by adding the "Iron Man 2" movie. Feature facility 306 may analyze the first and second curated sets of media program associated with the theme and determine that the "Iron Man 2" movie is included in the second set of media programs but not in the first set of media programs. Feature facility 306 may then recommend the "Iron Man 2" movie to the first user in conjunction with user interface content associated with the "Tights are OK" theme.

Figure 11:
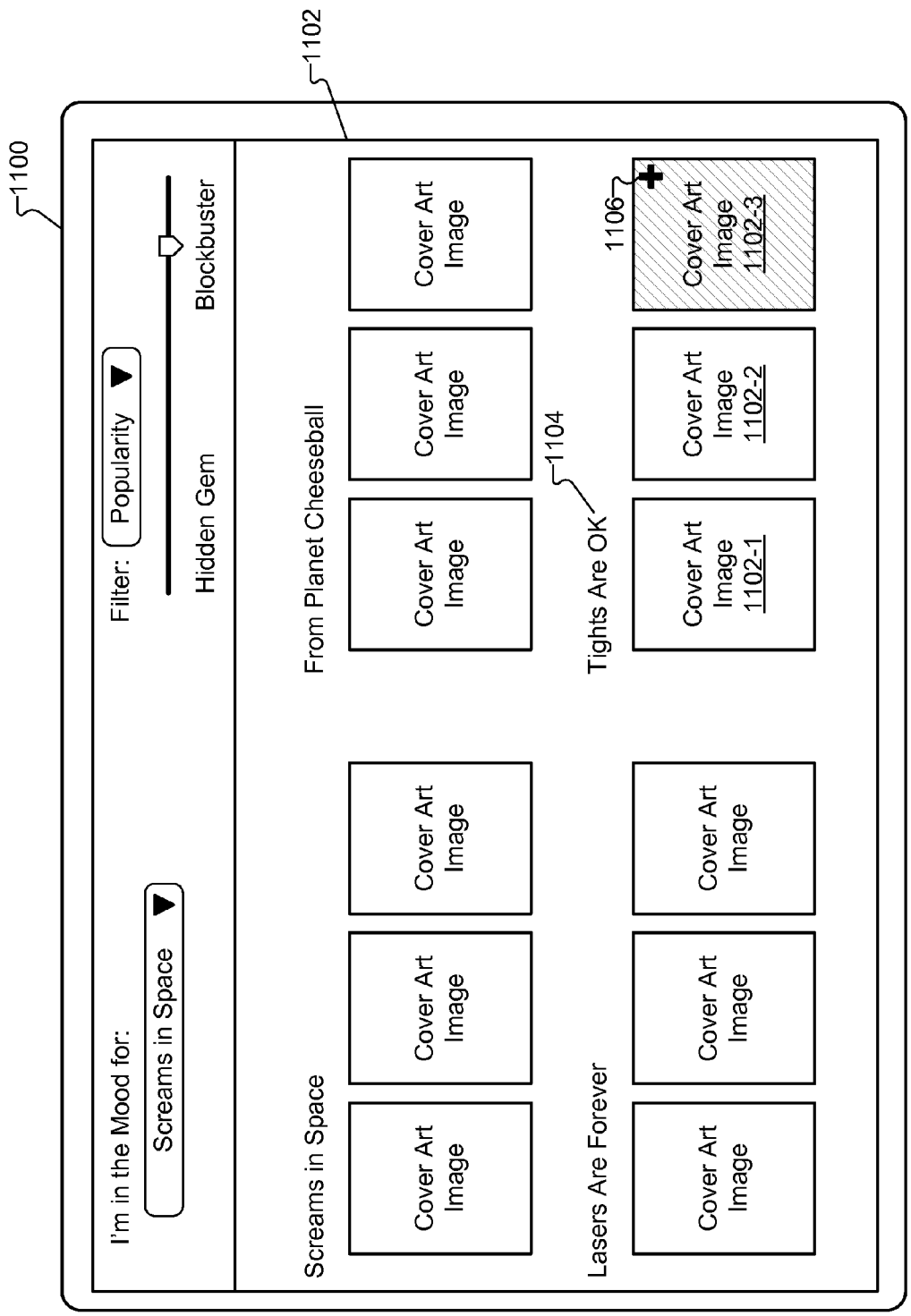
FIG. 11 illustrates an example of one or more theme-based media program discovery features in an exemplary graphical user interface view according to principles described herein.

To illustrate an example of user interface content recommending the "Iron Man 2" movie to the first user, FIG. 11 depicts a user computing device 1100 displaying a graphical user interface on a display screen 1102. The graphical user interface may include a themed media program navigation view similar to the themed media program navigation view illustrated in FIG. 8 and that further includes user interface content representing a theme-based media program recommendation. As shown, the themed media program navigation view may include cover art images 1102 (e.g., cover art images 1102-1 through 1102-3) grouped and presented to represent a curated set of media programs related to a theme 1104 titled "Tights are OK." Cover art images 1102-1 and 1102-2 may represent media programs included in the curated user-specific set of media programs associated with the first user, and cover art image 1102-3 may represent a recommendation of a media program related to theme 1104 but not included in the curated user-specific set of media programs associated with the first user. For instance, cover art image 1102-3 may comprise a theme-based recommendation of the "Iron Man 2" movie to the first user in conjunction with theme 1104.

Cover art image 1102-3 may be visually distinguished from cover art images 1102-1 and 1102-2 in the graphical user interface view to indicate that the media program represented by the cover art image 1102-3 is being recommended to the first user in conjunction with theme 1104 and is not already included in the curated user-specific set of media programs associated with the first user. For example, in FIG. 11, cover art image 1102-3 includes a diagonal line shading pattern to represent such a visual distinction. Other visual distinctions may be used in other examples, such as by darkening or partially graying out cover art image 1102-3 compared to cover art images 1102-1 and 1102-2.

Feature facility 306 may also provide one or more user interface options for use by a user to initiate a system operation associated with the recommended media program. For example, FIG. 11 illustrates the graphical user interface view to include an option 1106 configured to be selected by the first user to add the recommended media program to the curated user-specific set of media programs related to the "Tights are OK" theme associated with the first user and/or to another collection of media programs specific to the first user. Thus, in response to a user selection of option 1106, the recommended media program may be added to the curated user-specific set of media programs related to the "Tights are OK" theme associated with the first user and/or to another collection of media programs specific to the first user. Alternatively, a user selection of option 1106 may provide the user with access to information and/or additional options associated with the recommended media program.

Figure 12:
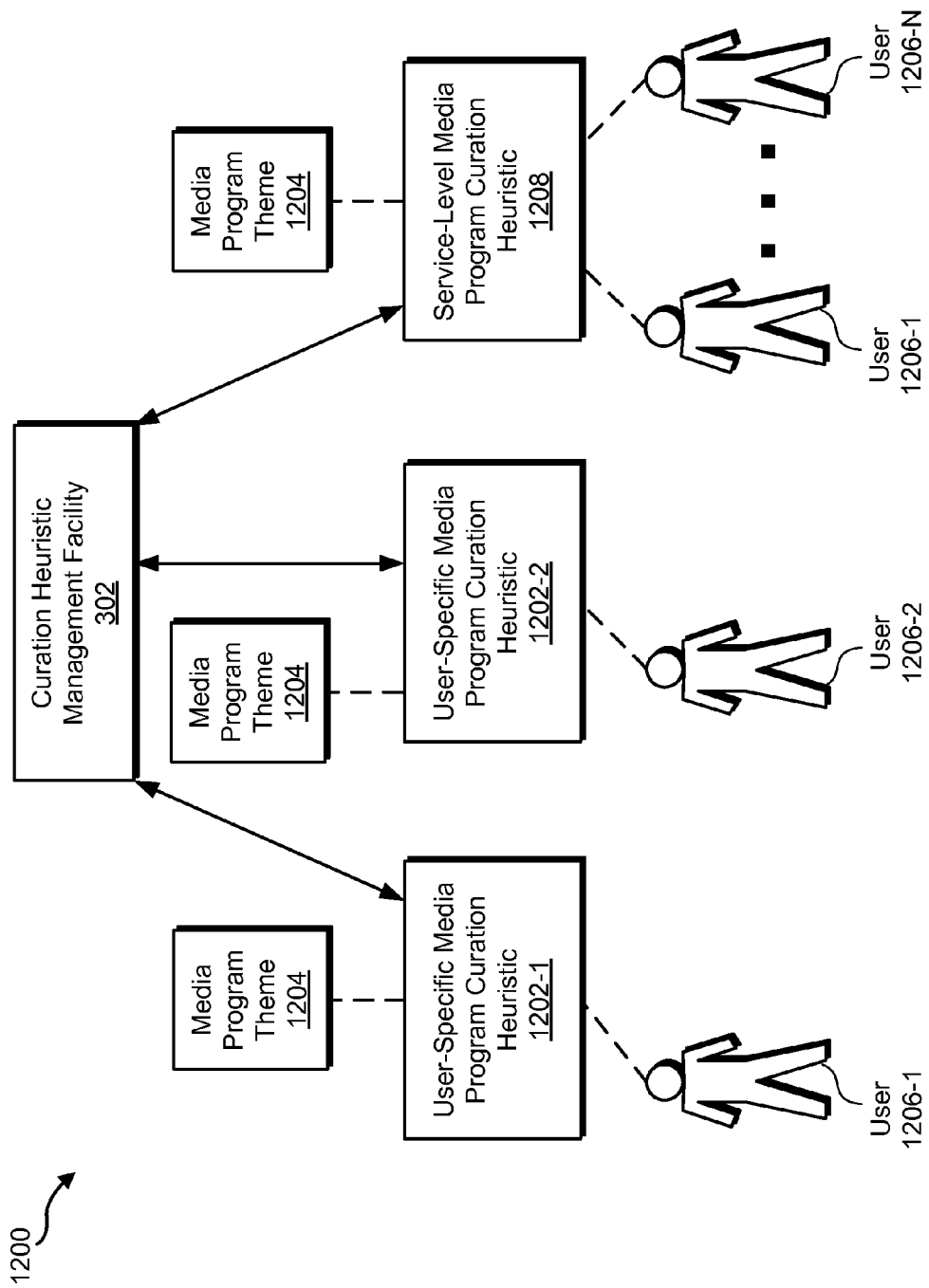
FIG. 12 shows an exemplary configuration in which user-specific curation heuristics and a service-level curation heuristic associated with the same media program theme are concurrently maintained according to principles described herein.

In addition to concurrently maintaining data representative of multiple discrete user-specific media program curation heuristics, such as represented in FIG. 10, management facility 302 may maintain, concurrently with the maintaining of the user-specific media program curation heuristics, data representative of a service-level media program curation heuristic. As used herein, a service-level media program curation heuristic is generally available and/or used service wide, for any end-user of the media and/or discovery service, and is not specific to one particular user. FIG. 12 illustrates a configuration 1200 in which management facility 302 concurrently maintains data representative of a first user-specific curation heuristic 1202-1 that is associated with a media program theme 1204 and is specific to a first user 1206-1, a second curation heuristic 1202-2 that is associated with the same media program theme 1204 and is specific to a second user 1006-2, and a service-level curation heuristic 1208 that is associated with the same media program theme 1204, as represented by the dashed lines in FIG. 12. Service-level curation heuristic 1208 is not specific to any particular user but may be generally available across the media service and/or discovery service for use by and/or application to any of the users of the service. In FIG. 12, service-level curation heuristic 1208 is shown to be associated with users 1206-1 through 1206-N, which may represent all users of the service or a sub-group of users of the service.

In certain examples, management facility 302 may be configured to maintain a service-level curation heuristic (e.g., service-level curation heuristic 1208) based at least in part on one or more user-specific curation heuristics (e.g., user-specific curation heuristics 1202-1 and 1202-2). This may include originally generating and/or updating the service-level curation heuristic based on one or more of the user-specific curation heuristics and/or curated sets of media programs that have been curated based on the user-specific curation heuristics. For example, management facility 302 may be configured to selectively combine parameters of user-specific curation heuristics associated with the same theme to originally generate a set of parameters for a service-level curation heuristic for the same theme.

To illustrate one example, management facility 302 may analyze user-specific curation heuristics associated with the same theme and, based on the analysis, may originally generate a service-level curation heuristic for the same theme. For instance, in certain examples, management facility 302 may generate the service-level curation heuristic to include a set of parameters associated with the theme and that includes only parameters that are shared by multiple user-specific curation heuristics. To illustrate, management facility 302 may select only parameters that are specified by each of user-specific curation heuristics 1202-1 and 1202-2 for inclusion in the service-level curation heuristic 1208. In other examples, management facility 302 may combine all parameters specified by user-specific curation heuristics 1202-1 and 1202-2 for inclusion in the service-level curation heuristic 1208.

To illustrate another example, management facility 302 may analyze curated sets of media programs that have been generated based on user-specific curation heuristics that are associated with the same theme and generate the service-level curation heuristic to include a set of parameters derived from the media programs included in the sets. For instance, a first curated set of media programs related to the "Tights are OK" theme and specific to a first user may include movies titled "Spiderman" and "Avengers," and a second curated set of media programs related to the same theme and specific to a second user may include movies titled "Avengers," and "Iron Man 2." Management facility 302 may analyze the first and second curated sets of media programs associated with the theme to identify the movies included therein and define a set of parameters based on the movies. In certain examples, for instance, management facility 302 may identify and insert metadata only for movies that are in both of the curated sets of media programs. In the present example, management facility 302 would identify and insert metadata for the "Avengers" movie into a set of parameters specified by the service-level curation heuristic. In other examples, management facility 302 may identify and insert metadata for movies that are included in either of the curated sets of media programs. In the present example, management facility 302 would identify and insert metadata for the ""Spiderman," Avengers," and "Iron Man 2" movies into a set of parameters specified by the service-level curation heuristic.

In this or a similar manner, management facility 302 may originally generate a service-level curation heuristic based on one or more user-specific curation heuristics associated with the same theme. Management facility 302 may similarly update the service-level curation heuristic based on updates to one or more user-specific curation heuristics associated with the same theme. Accordingly, management facility 302 may maintain discrete user-specific curation heuristics and a service-level curation heuristic for the same theme such that the service-level curation heuristic is automatically kept up-to-date based on user customizations of the user-specific curation heuristics and/or such that user-specific curation heuristics may be used by curation facility 304 for curation of media programs specific to particular users and service-level curation heuristic may be used by curation facility 304 for curation of media programs for general use by users of the media service and/or discovery service.

As described above, management facility 302 may concurrently maintain multiple discrete curation heuristics associated with a single media program theme. In certain examples, management facility 302 may select a specific subset of the discrete curation heuristics to use for certain operations, including any of the heuristic management and/or theme-based feature operations described herein. For example, management facility 302 may be configured to use a group of curation heuristics that are associated with the same theme and that share one or more other attributes and/or that have another specific relationship. For example, management facility 302 may be configured to use a group of user-specific curation heuristics that are associated with users included in a defined group of users that is a subset of all end users of the media service and/or discovery service (e.g., a designated group of friends, social media contacts, or movie club). Other relationships and/or shared attributes may be used in other examples.

As mentioned, management facility 302 may be configured to maintain a service-level media program curation heuristic associated with a media program theme and available for general access and/or user across the media service and/or discovery service. Feature facility 306 may be configured to provide one or more theme-based features based on the service-level curation heuristic. For example, similar to the description of providing a media program recommendation based on one or more user-specific curation heuristics, feature facility 306 may be configured to provide a media program recommendation to a user based on the service-level curation heuristic. To illustrate one example, management facility 302 may maintain a service-level curation heuristic, including by updating the service-level curation heuristic such that the service-level curation heuristic specifies a set of parameters that reflects a combination of multiple user-specific curation heuristics associated with the same theme. Accordingly, curation facility 304 may curate a set of media programs based on the service-level curation heuristic, and the curated set of media programs may be a superset of the sets of media programs that have been curated based on the user-specific curation heuristics. Feature facility 306 may compare the service-level set of media programs with a user-specific set of media programs and identify a media program that is included in the service-level set but not in the user-specific set. Feature facility 306 may provide a media program recommendation, in any of the ways described herein, to recommend the identified media program to a user associated with the user-specific set of media programs.

In certain examples, a service-level curation heuristic may be provided as a baseline curation heuristic upon which a user may build to create a custom, user-specific curation heuristic for the same theme. For example, the user may access a service-level set of media programs that has been curated based on the service-level curation heuristic. The user may provide input to customize the set of media programs, such as described herein. Based on the user customization, management facility 302 may originally generate or update a user-specified curation heuristic, such as described herein. This may include modifying a copy of the service-level curation heuristic based on the user customization to form the user-specific curation heuristic.

In certain examples, management facility 302 may be configured to recommend one or more existing curation heuristics to a user. For example, management facility 302 may detect that a user is creating or has created a user-specific curation heuristic, such as by adding media programs to a themed group. Management facility 302 may detect that the created curation heuristic is the same as or similar to another curation heuristic maintained by management facility 302. For example, management facility 302 may detect that the created curation heuristic is similar to a user-specific curation heuristic or a service-level curation heuristic maintained by management facility 302. In response to this detection, management facility 302 may provide a notification to the user to indicate that a similar curation heuristic already exists and ask the user to indicate whether the user wants to continue creating a custom curation heuristic or use the similar curation heuristic (e.g., subscribe to the existing curation heuristic).

If the user indicates that he or she wants to use the existing curation heuristic, management facility 302 may associate a copy of the existing curation heuristic with the user, and curation heuristic 304 may use the existing curation heuristic to generate a curated set of media programs that satisfy the parameters specified by the existing curation heuristic. For example, curation heuristic 304 may search a personalized collection of media programs associated with an account of the user (e.g., media programs that the user has manually associated with the user's account) and identify and add any of those media programs that satisfy the parameters of the curation heuristic to the curated set of media programs associated with the theme for the curation heuristic. Curation heuristic 304 may also recommend one or more other media programs that are not included in the user's personalized collection and that satisfy the parameters of the curation heuristic to the user in any of the ways described herein. In this or a similar manner, a user may leverage an existing curation heuristic to locate themed media programs and/or to create a custom user-specific curation heuristic.

Figure 13:
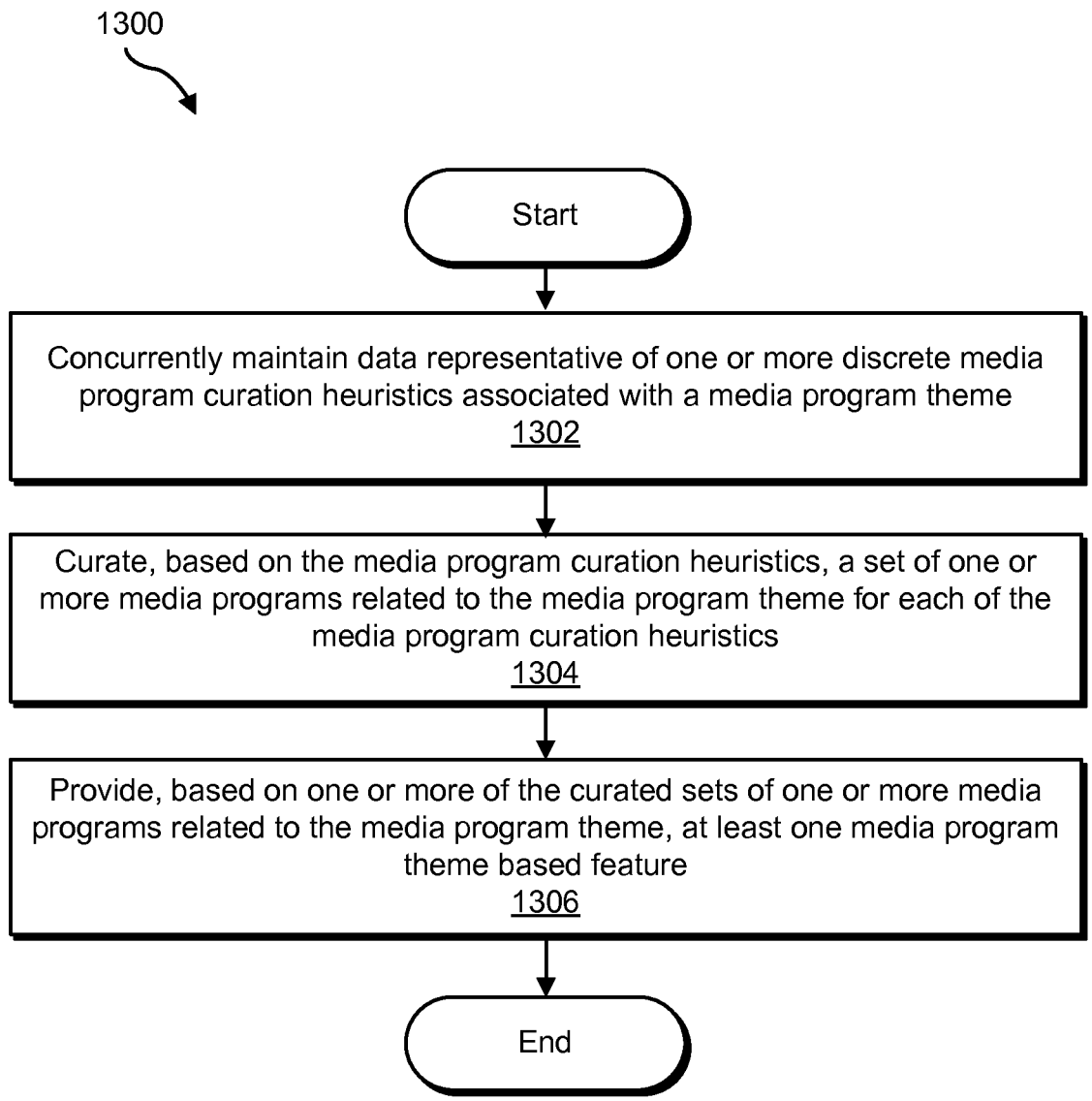
FIG. 13 illustrates an exemplary theme-based media program discovery method according to principles described herein.

FIG. 13 illustrates an exemplary theme-based media program discovery method 1300 according to principles described herein. While FIG. 13 illustrates exemplary steps according to certain embodiments, other embodiments may omit, add to, reorder, combine, and/or modify any of the steps shown in FIG. 13. In certain embodiments, one or more of the steps shown in FIG. 13 may be performed by system 100, system 300, and/or one or more components or implementations of system 100 and/or system 300.

In step 1302, a system (e.g., system 100 or 300) concurrently maintains data representative of one or more discrete media program curation heuristics associated with a media program theme. Step 1302 may be performed in any of the ways described herein. In certain examples, step 1302 may include the system concurrently maintaining multiple discrete active media program curation heuristics associated with a media program theme, such as described herein.

In step 1304, the system curates, based on the one or more media program curation heuristics, a set of one or more media programs related to the media program theme for each of the media program curation heuristics. Step 1304 may be performed in any of the ways described herein. In certain examples, step 1304 may include the system curating multiple sets of media programs related to the media program theme-based on respective media program curation heuristics.

In step 1306, the system provides, based on one or more of the curated sets of one or more media programs related to the media program theme, at least one media program theme-based feature. Step 1306 may be performed in any of the ways described herein. In certain examples, step 1306 may include the system providing any of the exemplary media program theme-based features described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 14:
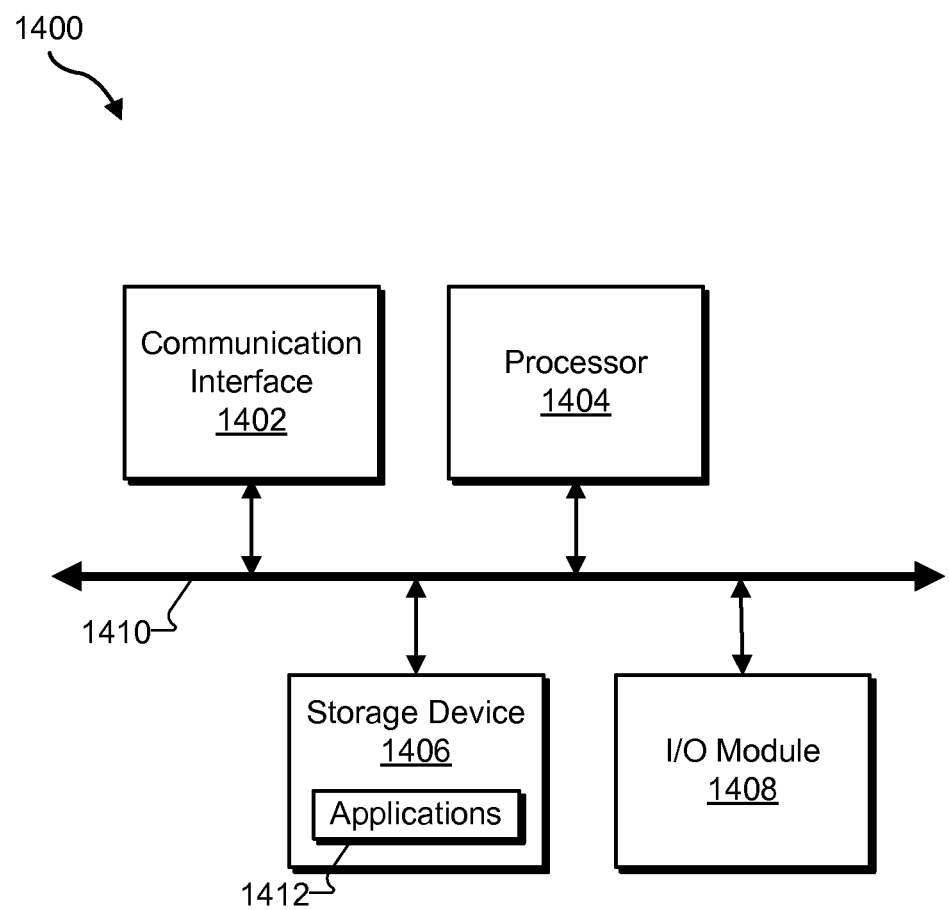
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, and any other suitable interface. Communication interface 1402 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1402 may be configured to interface with any suitable communication media, protocols, and formats.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another non-transitory computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1400. For example, one or more applications 1412 residing within storage device 1406 may be configured to direct processor 1404 to perform one or more processes or functions associated with one or more of the systems and/or facilities described herein. Likewise, any of the storage facilities described herein may be implemented by or within storage device 1406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
concurrently maintaining, by a theme-based media program discovery system configured to provide a theme-based media program discovery service, data representative of
a first active media program curation heuristic specific to a first user of the theme-based media program discovery service and that specifies a first set of curation parameters associated with a media program theme, the first set of curation parameters associated with the media program theme comprising a first set of one or more metadata values corresponding to metadata associated with a plurality of media programs, and
a second active media program curation heuristic specific to a second user and that specifies a second set of curation parameters associated with the media program theme, the second set of curation parameters associated with the media program theme comprising a second set of one or more metadata values corresponding to the metadata associated with the plurality of media programs;
curating, by the theme-based media program discovery system based on the first active media program curation heuristic, a first set of one or more media programs related to the media program theme;
curating, by the theme-based media program discovery system based on the second active media program curation heuristic, a second set of one or more media programs related to the media program theme;
comparing, by the theme-based media program discovery system, the curated first set of one or more media programs with the curated second set of one or more media programs, the comparing comprising identifying a media program that is included in the curated second set of one or more media programs specific to the second user and not included in the curated first set of one or more media programs specific to the first user; and
recommending, by the theme-based media program discovery system in response to the comparing, the media program to the first user in conjunction with the media program theme,
wherein the concurrently maintaining comprises
detecting an update to the first active media program curation heuristic, and
updating the second active media program curation heuristic based on the update to the first active media program curation heuristic.

2. The method of claim 1, further comprising:
providing, by the theme-based media program discovery system for presentation to the first user, user interface content representing the curated first set of one or more media programs related to the media program theme and the media program recommendation; and
providing, by the theme-based media program discovery system for presentation to the second user, user interface content representing the curated second set of one or more media programs related to the media program theme.

3. The method of claim 1, further comprising:
maintaining, by the theme-based media program discovery system concurrently with the maintaining of the first active media program curation heuristic that is specific to the first user and the second active media program curation heuristic that is specific to the second user, data representative of a third active media program curation heuristic that specifies a third set of curation parameters associated with the media program theme;
wherein the third active media program curation heuristic comprises a service-level media program curation heuristic.

4. The method of claim 3, wherein the maintaining of the data representative of the third active media program curation heuristic comprises at least one of:
originally generating, based on the first active media program curation heuristic and the second active media program curation heuristic, the data representative of the third active media program curation heuristic; and
updating, based on one or more updates to at least one of the first active media program curation heuristic and the second active media program curation heuristic, the third active media program curation heuristic to specify an updated third set of curation parameters associated with the media program theme.

5. The method of claim 1, embodied as computer-executable instructions on at least one non-transitory computer-readable medium.

6. A method comprising:
concurrently maintaining, by a theme-based media program discovery system configured to provide a theme-based media program discovery service, data representative of
a service-level media program curation heuristic that specifies a service-level set of curation parameters associated with a media program theme, the service-level set of curation parameters associated with the media program theme comprising a set of one or more metadata values corresponding to metadata associated with a plurality of media programs, and
a user-specific media program curation heuristic that specifies a user-specific set of curation parameters associated with the media program theme, the user-specific set of curation parameters associated with the media program theme comprising another set of one or more metadata values corresponding to the metadata associated with the plurality of media programs;
curating, by the theme-based media program discovery system based on the service-level media program curation heuristic, a service-level set of one or more media programs related to the media program theme;
curating, by the theme-based media program discovery system based on the user-specific media program curation heuristic, a user-specific set of one or more media programs related to the media program theme;
comparing, by the theme-based media program discovery system, the curated service-level set of one or more media programs with the curated user-specific set of one or more media programs, the comparing comprising identifying a media program that is included in the curated service-level set of one or more media programs and not included in the curated user-specific set of one or more media programs; and
recommending, by the theme-based media program discovery system in response to the comparing, the media program to a particular user associated with the user-specific media program curation heuristic in conjunction with the media program theme,
wherein the concurrently maintaining comprises
detecting a user customization of the user-specific set of one or more media programs related to the media program theme, updating, based on the user customization, the user-specific media program curation heuristic to specify an updated user-specific set of curation parameters, and updating, based at least in part on at least one of the user customization and the updating of the user-specific media program curation heuristic, the service-level media program curation heuristic to specify an updated service-level set of curation parameters.

7. The method of claim 6, wherein:
the user customization comprises an addition, by the particular user, of a media program to the user-specific set of one or more media programs; and
the updating of the user-specific media program curation heuristic comprises adding metadata associated with the media program to the user-specific set of curation parameters specified by the user-specific media program curation heuristic.

8. The method of claim 6, wherein:
the user customization comprises a deletion, by the particular user, of a media program from the user-specific set of one or more media programs; and
the updating of the user-specific media program curation heuristic comprises deleting metadata associated with the media program from the user-specific set of curation parameters specified by the user-specific media program curation heuristic.

9. The method of claim 6, wherein:
the user customization comprises an addition, by the particular user, of a media program to the user-specific set of one or more media programs; and
the updating of the service-level media program curation heuristic comprises adding metadata associated with the media program to the service-level set of curation parameters specified by the service-level media program curation heuristic.

10. The method of claim 6, wherein:
the user customization comprises a deletion, by the particular user, of a media program from the user-specific set of one or more media programs; and
the updating of the service-level media program curation heuristic comprises deleting metadata associated with the media program from the service-level set of curation parameters specified by the service-level media program curation heuristic.

11. The method of claim 6, wherein:
the media program theme and the service-level set of curation parameters specified by the service-level media program curation heuristic are originally defined by a provider of the theme-based media program discovery service; and
the concurrently maintaining further comprises
originally generating the service-level media program curation heuristic based on the media program theme and the service-level set of curation parameters defined by the provider, and
originally generating the user-specific media program curation heuristic based at least in part on the service-level media program curation heuristic.

12. The method of claim 6, wherein the concurrently maintaining further comprises:
detecting normal work flow input provided by the particular user;
originally generating the user-specific media program curation heuristic based on the normal work flow input provided by the particular user; and originally generating the service-level media program curation heuristic based at least in part on the user-specific media program curation heuristic.

13. The method of claim 6, wherein:
the user-specific media program curation heuristic is specific to the particular user; and
the method further comprises recommending, by the theme-based media program discovery system based on at least one of the curated service-level set of one or more media programs related to the media program theme and the curated user-specific set of one or more media programs related to the media program theme, at least one of the media program theme and a media program related to the media program theme to another user of the theme-based media program discovery service.

14. The method of claim 6, embodied as computer-executable instructions on at least one non-transitory computer-readable medium.

15. A system comprising:
at least one computing device comprising a processor that directs the at least one computing device to:
concurrently maintain, for a theme-based media program discovery service, data representative of
a first active media program curation heuristic specific to a first particular user of the theme-based media program discovery service and that specifies a first set of curation parameters associated with a media program theme, the first set of curation parameters associated with the media program theme comprising a first set of one or more metadata values corresponding to metadata associated with a plurality of media programs, and
a second active media program curation heuristic specific to a second particular user and that specifies a second set of curation parameters associated with the media program theme, the second set of curation parameters associated with the media program theme comprising a second set of one or more metadata values corresponding to the metadata associated with the plurality of media programs;
curate, based on the first active media program curation heuristic, a first set of one or more media programs related to the media program theme;
curate, based on the second active media program curation heuristic, a second set of one or more media programs related to the media program theme;
compare the curated first set of one or more media programs with the curated second set of one or more media programs by identifying a media program that is included in the curated second set of one or more media programs specific to the second particular user and not included in the curated first set of one or more media programs specific to the first particular user; and
recommend, in response to the comparing, the media program to the first particular user in conjunction with the media program theme,
wherein the concurrently maintaining comprises
detecting an update to the first active media program curation heuristic, and
updating the second active media program curation heuristic based on the update to the first active media program curation heuristic.

* * * * *